J. HARTMAN.
SLICING MACHINE.
APPLICATION FILED OCT. 27, 1919.

1,333,252.

Patented Mar. 9, 1920.

Witness:
T. F. Britt

Inventor:
J. Hartman
By Young & Young
Attorneys

UNITED STATES PATENT OFFICE.

JOHN HARTMAN, OF MILWAUKEE, WISCONSIN.

SLICING-MACHINE.

1,333,252. Specification of Letters Patent. Patented Mar. 9, 1920.

Application filed October 27, 1919. Serial No. 333,739.

*To all whom it may concern:*

Be it known that I, JOHN HARTMAN, a citizen of the United States, and resident of Milwaukee, in the county of Milwaukee and State of Wisconsin, have invented certain new and useful Improvements in Slicing-Machines, and I do hereby declare that the following is a full, clear, and exact description thereof.

My invention relates to new and useful improvements in machines for slicing meat, vegetables or other food products, and more particularly of that type including a cutting wheel having a series of radial blade members movable across one end of the chamber.

It is in general the object of my invention to simplify and otherwise improve the structure and to increase the efficiency of devices of this character, and also the readiness with which such devices may be operated.

It is more particularly my object to arrange the mechanism of a machine of this character in a casing whereby various portions of the mechanism are protected from dust and dirt when not in use, and whereby convenient chambers are provided for the work material.

A further object resides in the provision of an improved arrangement for feeding the work material to the knife blades at a uniform rate of movement.

With the above and other objects and advantages in view, which will be apparent as the description proceeds, my invention resides in the novel features of construction, combination and arrangement of parts which will be hereinafter more particularly described and defined by the appended claims.

Figure 1:
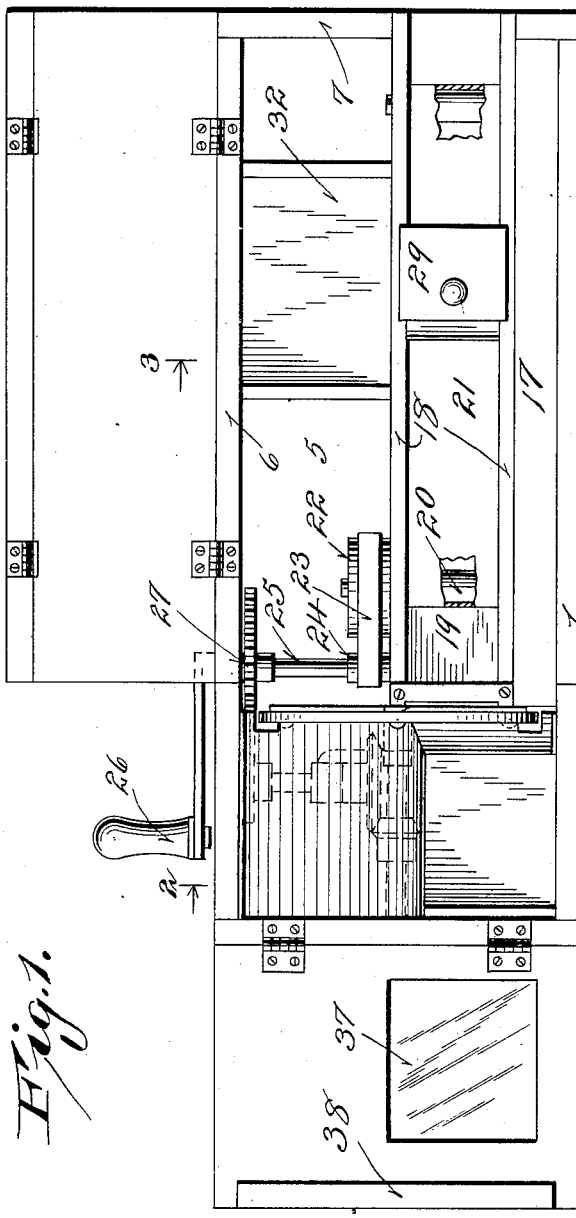
Figure 1 is a plan view of a slicing machine embodying my invention, the covers of the casing being swung to open position.
Figure 2:
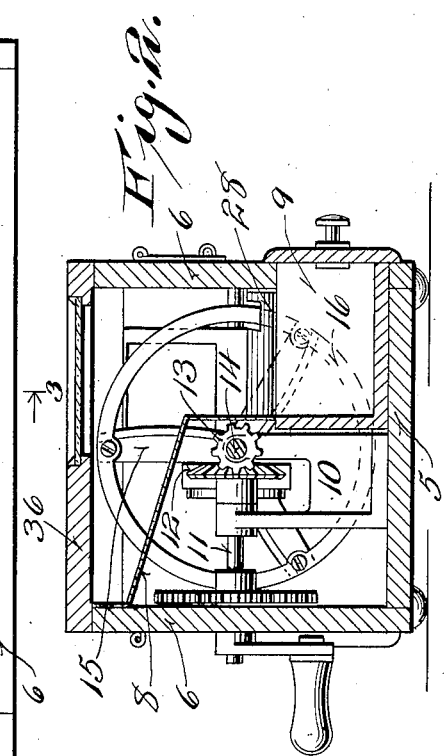
Fig. 2 is a transverse sectional view through the cutting end portion of the casing on a plane indicated by the line 2—2 of Fig. 1, the cover of said casing section being closed.

Referring now more particularly to the accompanying drawing, I provide a main casing formed of the body 5, side walls 6 and end walls 7, the walls at one end portion of the casing being slightly increased in height to provide clearance for the cutting wheel later to be described.

A shield plate 8 is disposed in this end portion of the casing, having its upper edge secured to one of the side walls and extended obliquely downwardly and inwardly therefrom, the lower end portion of the plate being extended vertically downward and terminating at the upper edge of the inner wall of a drawer 9 which is slidable in the casing through the other side wall. A bearing bracket 10 is disposed under the shield plate and journaled in this bracket is a shaft 11 extending transversely of the casing, said shaft carrying a gear wheel 12 on its inner end meshing with a pinion 13 on a shaft 14 which extends longitudinally of the casing, and carries a series of, in the present instance three radial knife blades 15, the outer ends of these blades being connected by an annulus 16, said blades and annulus thus forming a cutting wheel and being disposed at the inner side of the shield plate.

A spacer strip 17 extends inwardly from the upper edge of the side wall in which the drawer 9 is disposed, and this spacer strip is engaged with one of the vertical walls 18 of a feed chamber which is formed longitudinally in the main casing and extends from the cutting wheel to the remote end of the casing, said chamber having bottom sections 19 and having rollers 20 set in said bottom sections. An endless belt 21 is trained about these rollers and extends through the major portion of the bottom of the feed chamber, to thus provide for a uniform feed of work material toward the cutting wheel. This belt is driven by a pulley 22 mounted on the shaft of the roller 20 which is adjacent the knife wheel, a belt 23 being trained about the pulley 22 and about a pulley 24 on a shaft 25 which is journaled in a side wall of the casing and in the inner side wall 18 of the feed chamber. The shaft 25 carries an operating crank handle 26 exteriorly of the casing, and said shaft 25 also drives the cutting wheel by means of intermeshing gears 27 on said shaft 25 and on the shaft 11.

Thus, upon rotating the crank handle 26, the feed belt will be driven to feed work material toward the cutting wheel, and the cutting wheel will be simultaneously driven at a rapid speed to slice the work material, slices cut by said wheel dropping into the drawer 9, whereby the sliced material may be readily removed from the machine, and a second shield plate 28 extends obliquely from the bottom of the feed chamber to the upper edge of the adjacent side wall of the drawer 9.

To insure proper feeding movement of the work material on the belt 21, a work holder is provided comprising a plate 29 having a handle 30 and having a plurality of toothed gripping portions 31 depending therefrom. This holder is grasped and pressed onto the work material, which is in turn pressed against the feed belt to insure proper travel of the work material with the feed belt.

Figure 3:
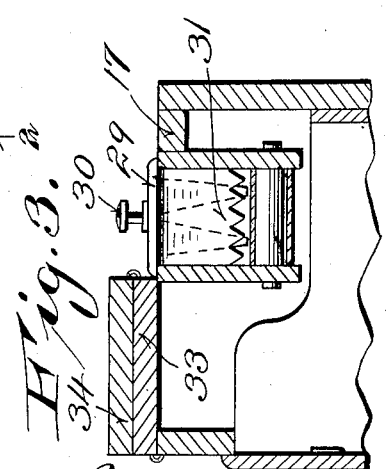
Fig. 3 is a transverse sectional view through an upper intermediate portion of the casing on a plane indicated by the line 3—3 of Fig. 1, the adjacent cover section being partially closed.

Considerable space is provided in the casing below the feed chamber, and in the present structure this space is utilized by a drawer 32 slidable through the side wall of the casing remote from the feed casing, and the work holder or other articles may be stored in this drawer. That portion of the casing in which the feed chamber is disposed, is provided with a cover formed into hingedly connected longitudinal sections 33 and 34, the section 33 being hinged to the side wall 6 remote from the feed chamber. Thus, the section 34 may be folded back on the section 33 as shown in Fig. 3 to expose only the feed chamber in the normal operation of the machine. The cutting end portion of the casing is closed by a cover 36 having a window 37 therein whereby the cutting operation may be observed, and this cover section also carries a depending wall portion 38 adapted to seat on the cover sections 33 and 34 to close off the space otherwise formed by the increased height of the cutting end portion of the casing.

I have thus provided a comparatively simple and efficient machine wherein a slicing operation on various materials may be conveniently performed, and while I have shown and described a preferred embodiment of my invention, it will be appreciated that various changes and modifications of structure may be employed within the scope of the appended claims without departing in any manner from the spirit of my invention.

What is claimed is:

1. A cutting machine comprising a casing, shield plates disposed in one end portion of the casing, a feed chamber extending longitudinally in the upper portion of the casing, a shaft extending longitudinally with respect to the casing and disposed under one of the shield plates, a cutting wheel mounted on said shaft and having radial blade members, said cutting wheel being disposed between the shield plates and the adjacent end of the feed chamber, a shaft journaled in the casing and extending outwardly thereof, operating means on the outer end of said last named shaft, and a train of gearing between said last named shaft and the first named shaft.

2. A cutting machine comprising a casing, shield plates disposed in one end portion of the casing, a feed chamber extending longitudinally in the upper portion of the casing, a shaft extending longitudinally with respect to the casing and disposed under one of the shield plates, a cutting wheel mounted on said shaft and having radial blade members, said cutting wheel being disposed between the shield plates and the adjacent end of the feed chamber, a shaft journaled in the casing and extending outwardly thereof, operating means on the outer end of said last named shaft, a train of gearing between said last named shaft and the first named shaft, a roller shaft in the lower portion of the feed chamber, a second idle roller shaft, a feed belt trained about said shafts, pulleys on the first named roller shaft and the primary drive shaft, and a belt trained about said pulleys.

In testimony that I claim the foregoing I have hereunto set my hand at Milwaukee in the county of Milwaukee and State of Wisconsin.

JOHN HARTMAN.